United States Patent [19]

Pearce et al.

[11] Patent Number: 4,712,221
[45] Date of Patent: Dec. 8, 1987

[54] CARRIER RECOVERY OF MODULATED SIGNALS

[75] Inventors: Harold B. Pearce; Lynn P. West, both of Austin, Tex.

[73] Assignee: International Business Machines Corporation, Armonk, N.Y.

[21] Appl. No.: 901,901

[22] Filed: Aug. 29, 1986

[51] Int. Cl.$^4$ .............................................. H04B 1/16
[52] U.S. Cl. ....................................... 375/14; 329/50; 375/97; 455/265
[58] Field of Search ........................ 331/1 A, 10, 11; 329/50, 104, 110, 122, 124; 375/11, 12, 14, 15, 39, 53, 56, 85, 97, 119; 455/257, 260, 265

[56] References Cited

U.S. PATENT DOCUMENTS

| | | | |
|---|---|---|---|
| 3,660,764 | 5/1972 | Goell | 375/84 |
| 4,253,184 | 2/1981 | Gitlin et al. | 375/14 |
| 4,447,910 | 5/1984 | Smith et al. | 375/14 |
| 4,457,005 | 6/1984 | Burke et al. | 375/82 |
| 4,468,794 | 8/1984 | Waters et al. | 375/103 |
| 4,555,667 | 11/1985 | Cressey et al. | 329/124 |
| 4,559,499 | 12/1985 | Bursztejn et al. | 329/122 |
| 4,560,941 | 12/1985 | Welles, II et al. | 329/124 |
| 4,587,498 | 5/1986 | Bonnerot et al. | 329/122 |
| 4,639,682 | 1/1987 | Takeuchi | 329/122 |

Primary Examiner—Benedict V. Safourek
Attorney, Agent, or Firm—J. F. Villella, Jr.; Andrea P. Bryant

[57] ABSTRACT

A method and apparatus are described for phase and frequency locking a reference oscillator to an incoming modulated signal. The method and apparatus enable the carrier recovery of the incoming modulated signal. Phase and frequency locking devices are connected in feedback loops with a coherent detector that determine the amount of phase and frequency error between the reference oscillator of the coherent detector and the incoming modulated signal. The feedback loops correct such frequency and phase error so as to enable the reference oscillator to be in phase and frequency step with the modulated signal.

11 Claims, 5 Drawing Figures

CARRIER RECOVERY OF MODULATED SIGNALS

DESCRIPTION

1. Technical Field

This invention relates to coherent detection using a signal processor, and more particularly, to the carrier recovery of a modulated signal such as a quadrature amplitude modulation (QAM) signal.

2. Background Art

In order to recover the information from a modulated signal, the demodulator must derive both the carrier phase and the carrier frequency. Most modulators transmit a carrier signal within a fairly tight tolerance. Typically, this tolerance is less than 0.001%. However, when communicating over a switched telephone network, the received carrier signal could be in error by as much as 0.006% due to carrier signal reinsertion. For a 1200 Hertz carrier signal, this would mean a frequency offset of over 7 Hertz.

The best currently known demodulators are coherent detectors. Such devices demodulate the carrier signal by multiplying it by a sine wave and a cosine wave that are phase and frequency locked to the incoming carrier signal. In a quadrature amplitude modulation (QAM) or a differential phase shift keyed (DPSK) signal, the received carrier signal is continuously modulated with resultant rapid changes of phase in the direction of modulation. The most significant problem in a coherent detector is to precisely determine the mean phase and frequency of such a highly volatile signal that has also been subjected to frequency offset and telephone line noise.

In the prior art, determination of both the phase and the frequency has involved frequency translation of the carrier signal to a very high frequency. The carrier signal is then extracted from this translated signal. This frequency translation technique is impractical in a signal processing environment because it requires a much greater sampling rate and therefore, an excessive processing load on the signal processor. This excessive processing load limits the capabilities of the signal processor to perform other functions.

U.S. Pat. No. 4,468,794 discloses a digital coherent detector which samples a band limited IF signal directly to obtain its in-phase and quadrature coefficients without using quadrature channels. The detector includes means for sampling and digitizing an analog band pass signal and also means connected to the output of the sampled and digitized signals for determining an estimate for a coefficient of a sinosoidal term. The invention further includes means for switching between the in-phase and quadrature output lines in accordance with a sampling frequency carrier pulse. The invention is primarily used in a radar receiving system and does not include a digital signal processor.

U.S. Pat. No. 4,457,005 discloses a digital demodulation system for demodulation and bit detection of phase shift keyed (PSK) signals. The demodulation system includes a master carrier oscillator and divider for frequency dividing the master carrier signal in order to provide sampling pulses. The PSK encoded signal is then sampled and stored and a difference detector generates a transition signal in response to the difference between the samples of two sampling circuits. A logic circuit divides the output of the divider by 2 and generates or subtracts a loop pulse and an add loop pulse. A control circuit then modifies the frequency of the sampling pulses according to whether or not a transition signal is received by either the add loop pulse or the subtract loop pulse. The sampling frequency is increased in response to the add loop pulse and decreased in response to the subtract loop pulse. In this manner, the sample pulses are synchronized with the incoming carrier signal.

U.S. Pat. No. 3,660,764 provides an example of an non-coherent differential phase detection system. In this system, a differentially phased modulated signal is detected without requiring a synchronous local oscillator. This is accomplished by decomposing the carrier signal into its baseband conjugate in-phase and out-of-phase components.

DISCLOSURE OF THE INVENTION

Accordingly, it is an object of this invention to provide coherent detection using a digital signal processor.

It is another object of this invention to provide improved carrier recovery of a modulated signal.

In accordance with these and other objects of the invention, a method and apparatus for carrier recovery of a modulated signal such as would be received by a modem from a telephone line using a digital signal processor is disclosed. A carrier signal is input to a phase error detector which analyzes the two components of the carrier, i.e., in-phase and quadrature. The phase error is estimated from the difference between the angle of a vector of maximum length and an expected angle of such vector. The phase error is then used to update the phase of a reference oscillator which is continually updated so that the carrier and the reference oscillator are in phase lock. The phase is updated proportionally to the phase error with the update constrained by a confidence factor which allows the phase to be adjusted more aggressively on start-up, and less aggressively as frequency locking is achieved. Additionally, frequency differences between the carrier signal and the reference oscillator may be estimated over a period of several symbol times. The frequency estimate is then used to adjust the frequency of the reference oscillator. By continually updating the frequency of the reference oscillator, the carrier and reference oscillator will quickly frequency lock.

BEST MODE FOR CARRYING OUT THE INVENTION

Figure 1:
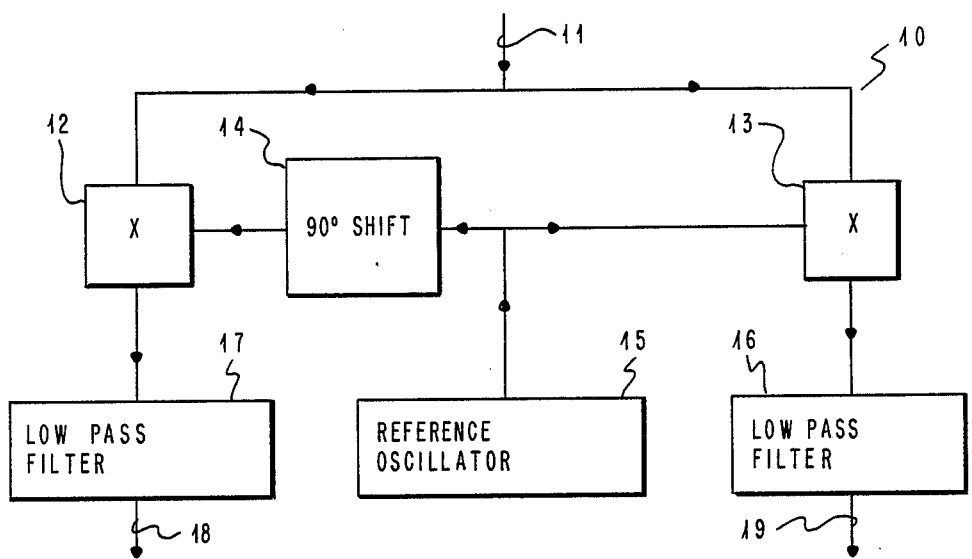
FIG. 1 is a functional block diagram of carrier recovery of a modulated signal according to the present invention.

The input 11 to the coherent detector 10 shown in FIG. 1 is a differential phase shift keyed (DPSK) signal which may be represented by Sin[Wc(t)+P(t)], wherein Wc(t) is the carrier frequency as a function of time, t is time, and P(t) is a variable representing phase changes due to information encoding as a function of time. Reference oscillator 15 may be represented as Sin[Wr(t)]. Coherent detector 10 transposes phase change information down to the baseband by simple multiplication and filtering. The multiplication is provided by multipliers 12 and 13, and the filtering is provided by low pass filters 16 and 17.

Before filtering, the in-phase channel signal output from multiplier 13 may be represented as Sin[Wc(t)+P(t)]× Sin[Wr(t)]. After passing such signal through low pass filter 16 and neglecting small gain terms, the signal output over line 19 representing the in-phase signal can be represented as Cos[Wc(t)−Wr(t)+P(t)]. Note that a 90 degree phase shift is provided by block 14 to the output of reference oscillator 15 before it is input to multiplier 12. Similarly, the quadrature component of the signal output from low pass filter 17 over line 18 can be represented as Sin[Wc(t)−Wr(t)+P(t)].

It can be seen that when the quadrature and in-phase signals are of the same frequency that the signals represent the sine or cosine of the phase changes. A difference in frequency will result in a phase error term. Consequently, either of outputs 18 or 19 will contain phase encoded information and also a phase error. In order to overcome these problems, the in-phase and quadrature components are subjected to carrier frequency tracking in order to detect the error term and adjust the reference oscillator 15 accordingly to drive the phase error to 0.

Figure 2:
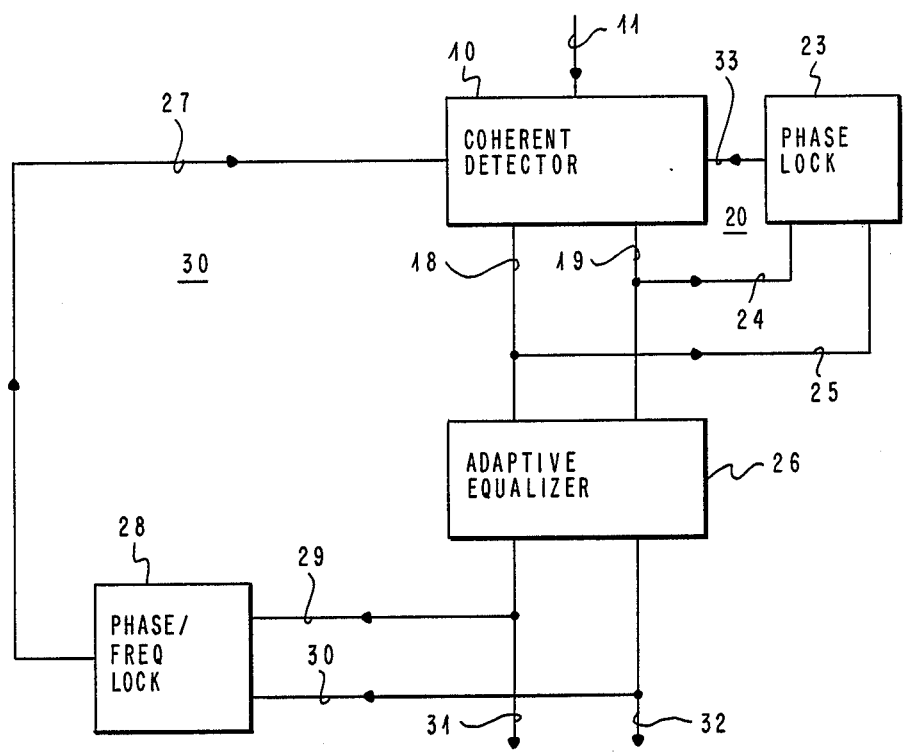
FIG. 2 is a functional block diagram of a carrier frequency tracking mechanism according to the present invention.

Coherent detector 10 is a part of the carrier frequency tracking mechanism of FIG. 2. The carrier frequency tracking mechanism comprises an inner loop 20 and an outer loop 30 for correcting phase error. The inner loop 20, which includes coherent detector 10 and its outputs 18 and 19 as well as phase lock 23 and its inputs 24 and 25, achieves frequency lock-in on start up and maintains such phase lock for abrupt phase changes. The outer feedback loop, which includes coherent detector and its outputs 18 and 19, adaptive equalizer 26, phase and frequency adjustment 28 and its inputs 29 and 31 as well as its output 27, functions to keep the phase difference between the reference oscillator 15 and the modulated signal input on line 11 within a predetermined tight tolerance.

The operation of the inner feedback loop 20 will be described in more detail with reference to FIG. 3. The logic controlling interfeedback loop 20 is implemented in a signal processor. The function of the inner feedback loop 20 is to achieve phase lock as quickly as possible after the receipt of an incoming signal on line 11 and to maintain such phase lock for abrupt changes in the phase of the incoming signal. Phase lock is achieved by estimating the phase error and compensating for the error with adjustments to reference oscillator 15 on line 33. The magnitude of such adjustments are proportional to the magnitude of the phase error. The magnitude of such adjustments is also related to a confidence factor which is based on time. This confidence factor allows the phase adjustments to be done much more aggressively when a signal is initially received on line 11 in order to achieve a faster phase lock.

The adjustment in the phase is the product of the sign of the phase error times the phase error magnitude times the aforementioned confidence factor. The phase adjustment to reference oscillator 15 is made by adding the adjustment term formed by such product to the phase of the reference oscillator 15, i.e., the new phase of reference oscillator 15 will be the old phase plus the adjustment factor.

Considering the in-phase and quadrature elements of the carrier signal output from coherent detector 10 on lines 18 and 19, respectively, to constitute a phasor, the magnitude of such phasor may be calculated. For ease of calculation, the squared magnitude of the phasor can be used and is given by the sum of the in-phase component squared plus the quadrature component squared. This squared magnitude is then input on line 41 to block 42 wherein the maximum magnitude phasor in each sample set is determined. It is this maximum magnitude phasor that is used to estimate the phase error. By definition, the phasor of greatest magnitude should be on an axis of a phasor plot, i.e., 0, 90, 180, or 270 degrees. The magnitude of the phase error is then estimated in block 45 to be the distance from the phasor to the nearest axis of a phasor plot.

In block 46 the adjustment to the phase is then calculated. The direction of the phase adjustment, i.e., sign of the phase error, is determined by which side of the nearest axis on the phasor plot that the phasor is located. If the phasor is on the clockwise side of the nearest axis, then reference oscillator 15 is slightly ahead of the modulated signal input on line 11. Conversely, if the phasor is on the counterclockwise side of the nearest axis of the phasor plot, then reference oscillator 15 is slightly behind the modulated signal input on line 11.

Table 1 summarizes the relationship between the type of modulated signal, i.e., in-phase or quadrature, and the resulting sign of the error in the phase. Note that the distance between the phasor and the nearest axis on the phasor plot is the smaller element of the two phasor components—the in-phase or quadrature component.

TABLE I

| LARGER ELEMENT | SIGN OF LARGER ELEMENT | SIGN OF SMALLER ELEMENT | PHASE ERROR SIGN |
| --- | --- | --- | --- |
| IN PHASE | + | + | + |
| IN PHASE | + | − | − |
| IN PHASE | − | + | − |
| IN PHASE | − | − | + |
| QUADRATURE | + | + | − |
| QUADRATURE | + | − | + |
| QUADRATURE | − | + | + |
| QUADRATURE | − | − | − |

Decision block 43 and line 44 only come into play when the incoming modulated signal is QAM. A QAM signal is similar to a DPSK signal except that the information is not only encoded with phase changes but also with amplitude changes. DPSK signals consist of phase changes of 0, 90, 180, or 270 degrees. QAM signals also encode with phase changes of 0, 90, 180, or 270, but each phase change may be perturbed slightly in both phase and amplitude. This a single phase change is expanded to four possible phase changes and thus can encode more information.

Table 2 summarizes four separate perturbation situations along with accompanying amplitude and phase change information.

TABLE 2

| PERTURBATION | AMPLITUDE | PHASE CHANGE |
| --- | --- | --- |
| NO | MAXIMUM | NONE |

TABLE 2-continued

| PERTURBATION | AMPLITUDE | PHASE CHANGE |
| --- | --- | --- |
| TYPE 1 | 0.75 × MAXIMUM | +26° |
| TYPE 2 | 0.75 × MAXIMUM | −26° |
| TYPE 3 | 0.33 × MAXIMUM | NONE |

If no account was made for perturbations in a QAM signal, then a phasor with a perturbation of either type 1 or type 2 would be interpreted as a 26 degree phase error. No account would be made for the amplitude changes. In order to overcome this problem, the phase is adjusted only when the phasor is not perturbed. This situation is shown in FIG. 3 wherein if the answer to decision block 43 is yes, i.e., a perturbation has occurred, then no further error estimation and adjustment is performed. The carrier frequency mechanism as shown by line 44 merely branches to output 48 and awaits the next maximum phasor.

The operation of outer feedback loop 30 will now be described in more detail with respect to the flow chart of FIG. 4. The outer loop phase adjustment is very similar to that of the inner loop as can be seen when comparing the flowcharts of FIG. 3 and FIG. 4. Adaptive equalizer 26 which forms a part of outer loop 30 cleans up the signals output from coherent detector 10 over lines 18 and 19 by compensating for phase and amplitude distortion induced by a telephone line, thereby allowing the phase error to be estimated much more accurately. However, since adaptive equalizer 26 induces several milliseconds of delay, outer loop 30 makes the carrier frequency tracking mechanism FIG. 2, less stable. Additionally, the adaptive equalizer 26 does not behave well in the presence of feedback due to its adaptive nature.

Adaptive equalizer 26 decimates the signals received on lines 18 and 19 from coherent detector 10 down to the symbol rate chosen. Consequently, every sample from adaptive equalizer 26 represents the phasor for the mid-symbol time. Since the symbols should occur on the axis of the phasor plot (0, 90, 180, 270 degrees), the error again is estimated to be the distance from the phasor to the nearest axis on the phasor plot. In block 54, the magnitude and sign of the phase error is derived in the same manner as for the inner feedback loop 20. From this, a calculate adjustment is done in block 55 and the phase of reference oscillator 15 is adjusted in block 56.

As previously described with respect to inner loop 20, decision block 52 determines whether or not a perturbation has occurred. This would be the case if a QAM signal were received. As shown in FIG. 4, if a perturbation has occurred, then line 53 branches to the end 60 and no error estimate or phase adjustment is made until the perturbation has ceased.

The phase locking technique described herein before merely updates the phase of reference oscillator 15 in order to maintain a phase lock with the incoming modulated signal. Performance of the phase locking can be greatly improved when the frequency of reference oscillator 15 is also adjusted to match that of the modulated signal.

As shown in FIG. 2, block 28 includes a frequency adjustment mechanism which provides frequency lock information over line 27 to coherent detector 10. This information is used to adjust the frequency of reference oscillator 15. This is done by estimating the difference in frequency between the reference oscillator 15 and the incoming signal 11 by monitoring the phase adjustments required over time.

Figures 3, 4:
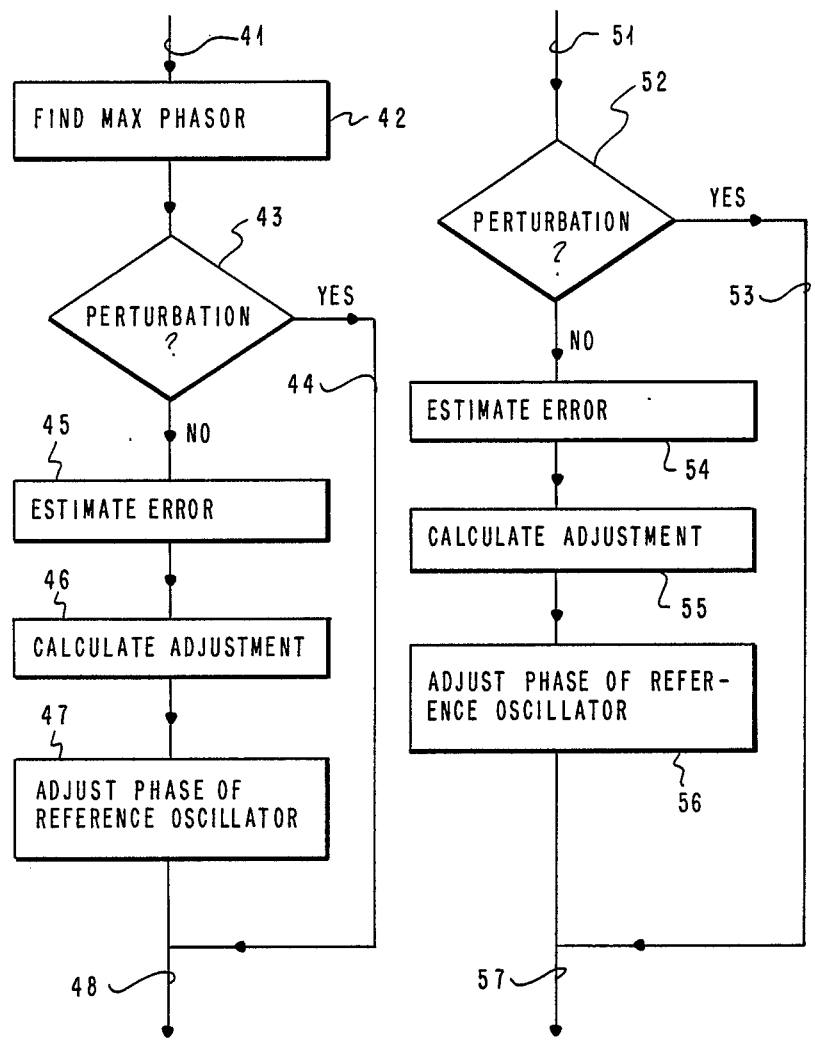
FIG. 3 is a flow chart depicting the operation of the logic inner feedback loop 20 (FIG. 2) for enabling phase lock of a carrier signal according to the present invention.
FIG. 4 is a flow chart of outer feedback loop 30 (FIG. 2) for enabling phase lock of a carrier signal according to the present invention.

For every phase adjustment in outer loop 30, FIG. 4, the phase adjustment should be integrated at block 56. If the resulting integration is greater as determined at block 58 than a predetermined threshold, then the frequency of the reference oscillator 15 is adjusted at block 59 by adding to the reference oscillator frequency the product of the sign of the integral times a predetermined confidence factor that is a function of time.

The confidence factor is given by the equation, $CONF = [(CONF\ INITIAL) \times (0.0996)^T] + CONF\ FINAL$, where CONF is the confidence factor, CONF INITIAL is an initial value, CONF FINAL is a final value, wherein both are less than 1, and CONF INITIAL is much greater than CONF FINAL, and T is a measure of time in the sampling rate units, 1/9600 second units.

Figure 5:
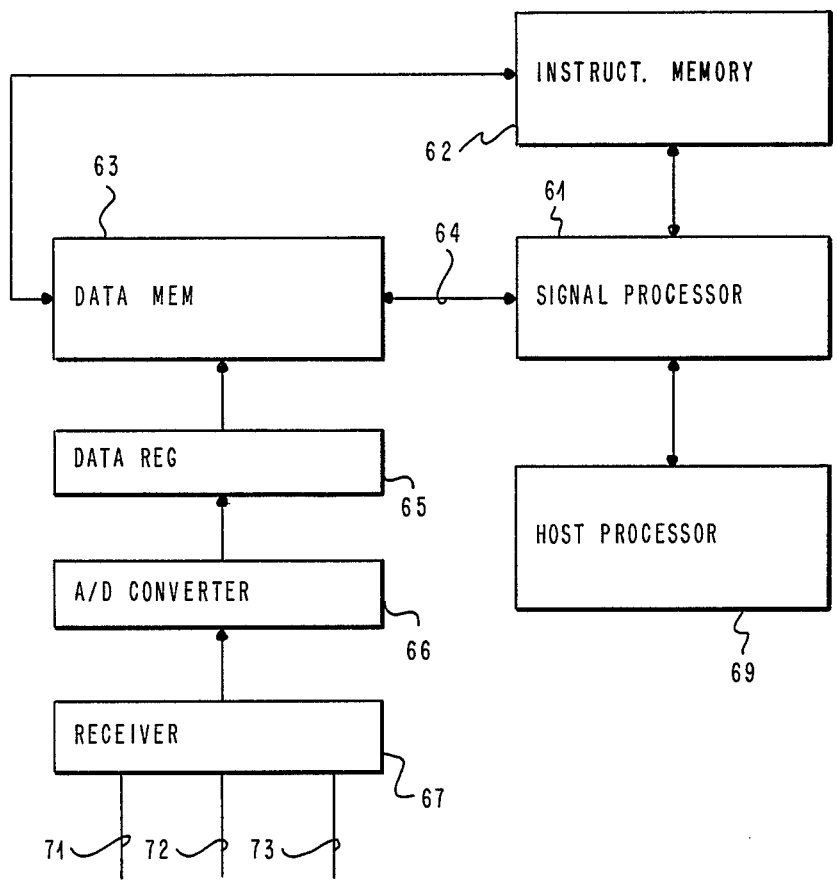
FIG. 5 is an overall block diagram of the hardware of the system in which the present invention is embodied.

A simplified overall functional block diagram is shown in FIG. 5. Signal processor 61 may be any commercially available signal processor. An example of such a signal processor is the Texas Instruments TMS32010. Signal processor 61 is totally controlled by host processor 69 and must have its central processing unit instructions loaded before operation. Signal processor 61 uses instruction memory 62 as well as data memory 63. Both of these memories are accessible by host processor 69 although not at the same time as signal processor 61. Instruction memory 62 is accessible by host processor 69 only when signal processor 61 is turned off, i.e., reset. At that time, host processor 69 can load from instruction memory 62 and then switch to data memory 63, which is shared at all times dynamically with signal processor 61. Both signal processor 61 and host processor 69 have the capability to interrupt one another with interrupt masking under control of host processor 69.

Incoming high speed modem signals are input over lines 71–73 to receiver 67. These incoming high speed modem signals, which are in analog format, are converted to digital by A/D converter 66 and temporarily stored in data register 65. These digitized signals are then input to data memory 63. A/D converter 66 provides digitized sample sets of the analog signals input over lines 71–73. It is these digitized samples which are stored in data memory 63 and which are operated upon by signal processor 61 so as to frequency and phase lock reference oscillator 15 with the signal incoming on line 11 to coherent detector 10.

In the best mode described herein, the incoming high speed modem signals are sampled at 9600 Hertz. The symbol time of the incoming modulated signals is 1.6 milliseconds which insures a symbol every 16 samples. The best mode described herein provides Bell 212a/CCITT V22bis compatibility. Both of these protocols have symbol times of 1.6 milliseconds as provided by the carrier recovery mechanism described in the present invention.

While the invention has been particularly shown and described with reference to a preferred embodiment, it will be understood by those skilled in the art that various other changes in form and detail may be made without departing from the spirit and scope of the invention.

What is claimed is:

1. A method for recovering the carrier of a modulated signal in a signal processing system, comprising:
   analyzing said modulated signal and determining a vector of maximum magnitude;

estimating a phase error from the difference between an angle of said vector and a predetermined angle; and, adjusting the phase of a reference oscillator according to said estimated phase error for phase locking said modulated signal and said reference oscillator.

2. A method according to claim 1 further comprising:

estimating a frequency error by integrating the phase change in said reference oscillator after updating; and, updating the frequency of said reference oscillator from the result of integrating the phase change for frequency locking said reference oscillator and said modulated signal.

3. A signal processing system, including a coherent detector having a reference oscillator, for recovering the carrier in a modulated signal, comprising:

means for analyzing said modulated signal and determining a vector of maximum magnitude;

means for estimating a phase error comprising determining the difference between the angle of said vector and a predetermined angle; and, means for updating the phase of said reference oscillator for phase locking said modulated signal and said reference oscillator.

4. a signal processing system according to claim 3 further comprising:

means for calculating from said phase error an adjustment value for adjusting the phase of said reference oscillator.

5. A signal processing system according to claim 4 wherein said means for updating the phase of said reference oscillator further comprises means for adding said adjustment value to the phase of said reference oscillator.

6. A signal processing system according to claims 4 or 5 additionally including:

means for calculating said adjustment value, comprising means for multiplying the magnitude of said phase error times the sign of said phase error times a confidence factor.

7. A signal processing system according to claim 6 wherein said confidence factor is time varying.

8. A signal processing system according to claim 7 wherein said confidence factor is given by, $$CONF = [(CONF\ INITIAL) \times (0.996)^T] + CONF\ FINAL,$$

wherein CONF is the confidence factor, T is time in seconds, and CONF INITIAL and CONF FINAL are predetermined initial and final confidence values both less than 1 and wherein CONF INITIAL is much greater than CONF FINAL.

9. A signal processing system, including a coherent detector having a reference oscillator, for recovering the carrier in a modulated signal, comprising:

means connected in a first feedback loop with said coherent detector for phase locking said reference oscillator to said modulated signal on start up; and, means connected in a second feedback loop with said coherent detector for maintaining phase locking of said reference oscillator to said modulated signal within a predetermined tolerance.

10. A signal processing system according to claim 9 wherein said second feedback loop further comprises an adaptive equalizer connected to the output of said coherent detector for removing phase and amplitude distortion in said modulated signal.

11. A signal processing system according to claims 9 or 10 further comprising means for frequency locking said reference oscillator to said modulated signal.

* * * * *